United States Patent

Han

(10) Patent No.: US 9,805,687 B2
(45) Date of Patent: Oct. 31, 2017

(54) DISPLAY DRIVER INTEGRATED CIRCUIT, DISPLAY MODULE AND DISPLAY SYSTEM INCLUDING THE SAME

(71) Applicant: SAMSUNG DISPLAY CO., LTD., Yonging, Gyeonggi-Do (KR)

(72) Inventor: Ho-Seok Han, Cheonan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 108 days.

(21) Appl. No.: 14/755,482

(22) Filed: Jun. 30, 2015

(65) Prior Publication Data

US 2016/0063948 A1 Mar. 3, 2016

(30) Foreign Application Priority Data

Sep. 3, 2014 (KR) .................. 10-2014-0117281

(51) Int. Cl.
- *G09G 5/00* (2006.01)
- *G06F 3/14* (2006.01)
- *G09G 5/391* (2006.01)

(52) U.S. Cl.
CPC ........... *G09G 5/003* (2013.01); *G06F 3/1446* (2013.01); *G09G 5/391* (2013.01); *G09G 2310/04* (2013.01); *G09G 2310/08* (2013.01); *G09G 2330/021* (2013.01); *G09G 2360/02* (2013.01); *G09G 2360/08* (2013.01); *G09G 2370/042* (2013.01); *G09G 2370/045* (2013.01); *G09G 2370/08* (2013.01); *G09G 2370/10* (2013.01)

(58) Field of Classification Search
CPC .... G09G 5/003; G09G 5/391; G09G 2310/04; G09G 2310/05; G09G 2330/021; G09G 2360/08; G09G 2360/02; G09G 2370/042; G09G 2370/045; G09G 2370/08; G09G 2370/10

See application file for complete search history.

(56) References Cited

U.S. PATENT DOCUMENTS

| | | | |
|---|---|---|---|
| 2006/0125784 A1* | 6/2006 | Jang ............... | G06F 1/1616 345/156 |
| 2010/0225565 A1 | 9/2010 | Freitas et al. | |
| 2011/0156936 A1 | 6/2011 | Kim et al. | |
| 2012/0194487 A1* | 8/2012 | Roethig ............ | G06F 3/1423 345/204 |
| 2013/0044088 A1 | 2/2013 | Chian et al. | |
| 2014/0168197 A1* | 6/2014 | Kobayashi ......... | G09G 3/2096 345/212 |

FOREIGN PATENT DOCUMENTS

| KR | 10-2011-0078164 A | 7/2011 |
|---|---|---|
| KR | 10-2011-0078471 A | 7/2011 |

* cited by examiner

*Primary Examiner* — Sahlu Okebato
(74) *Attorney, Agent, or Firm* — Lee & Morse, P.C.

(57) ABSTRACT

A display driver integrated circuit includes a first slave module and a second slave module. The first slave module is initially set as a primary module to receive a mode conversion command, and is disabled based on the mode conversion command. The second slave module is initially set as a secondary module that does not receive the mode conversion command, and is set as the primary module instead of the first slave module when the first slave module is disabled. The first and second slave modules control processing or transfer of data through a channel included in or coupled to a display according to a predetermined protocol.

18 Claims, 16 Drawing Sheets

FIG. 6

| COMMAND | HEX CODE | COMMAND | NUMBER OF PARAMETERS |
|---|---|---|---|
| enter_normal_mode | 13h | THE WHOLE DISPLAY AREA IS USED FOR IMAGE DISPLAY | 0 |
| enter_partial_mode | 12h | PORTION OF THE DISPLAY AREA IS USED FOR IMAGE DISPLAY | 0 |
| set_page_address | 2Bh | SET THE PAGE EXTENT | 4 |
| set_partial_rows | 30h | DEFINES THE NUMBER OF ROWS IN THE PARTIAL DISPLAY AREA ON THE DISPLAY DEVICE | 4 |

FIG. 7A

| 30H | WRITE/READ | D7 | D6 | D5 | D4 | D3 | D2 | D1 | D0 | HEX |
|---|---|---|---|---|---|---|---|---|---|---|
| COMMAND | WRITE | 0 | 0 | 1 | 1 | 0 | 0 | 0 | 0 | 30 |
| 1ST PARA. | WRITE | SR15 | SR14 | SR13 | SR12 | SR11 | SR10 | SR9 | SR8 | 0000...03FF |
| 2ND PARA. | WRITE | SR7 | SR6 | SR5 | SR4 | SR3 | SR2 | SR1 | SR0 | |
| 3RD PARA. | WRITE | ER15 | ER14 | ER13 | ER12 | ER11 | ER10 | ER9 | ER8 | 0000...03FF |
| 4TH PARA. | WRITE | ER7 | ER6 | ER5 | ER4 | ER3 | ER2 | ER1 | ER0 | | set_partial_rows

FIG. 8A

| 2BH | | | | | | | | | | set_page_address | | |
|---|---|---|---|---|---|---|---|---|---|---|---|---|
| | WRITE/READ | D7 | D6 | D5 | D4 | D3 | D2 | D1 | D0 | HEX |
| COMMAND | WRITE | 0 | 0 | 1 | 0 | 1 | 0 | 0 | 0 | 2B |
| 1ST PARA. | WRITE | SP15 | SP14 | SP13 | SP12 | SP11 | SP10 | SP9 | SP8 | 00H |
| 2ND PARA. | WRITE | SP7 | SP6 | SP5 | SP4 | SP3 | SP2 | SP1 | SP0 | 00H |
| 3RD PARA. | WRITE | EP15 | EP14 | EP13 | EP12 | EP11 | EP10 | EP9 | EP8 | 03H |
| 4TH PARA. | WRITE | EP7 | EP6 | EP5 | EP4 | EP3 | EP2 | EP1 | EP0 | FFH |

DISPLAY DRIVER INTEGRATED CIRCUIT, DISPLAY MODULE AND DISPLAY SYSTEM INCLUDING THE SAME

CROSS-REFERENCE TO RELATED APPLICATION

Korean Patent Application No. 10-2014-0117281, filed on Sep. 3, 2014, and entitled, "Display Driver Integrated Circuit, Display Module and Display System Including the Same," is incorporated by reference herein in its entirety.

BACKGROUND

1. Field

One or more embodiments described herein relate to a display driver integrated circuit, a display module, and a display system including a display driver integrated circuit.

2. Description of the Related Art

Advances in display and image sensor technology require greater data processing capability. This is especially true in mobile devices which have high-resolution displays. Achieving this capability has not come without drawbacks. For example, the routing complexity of transfer lines has increased along with electromagnetic interference. Both have an adverse effect on performance.

Attempts have been made to solve these problems. For example, research into improved forms of serial interface technologies has been conducted. Examples include mobile industry processor interface (MIPI) and mobile display digital interface (MDDI) technologies.

MIPI is used in mobile products having a display of higher resolution than nHD (360*640 pixels). According to the current specification for D-PHY of the MIPI alliance, the maximum number of data lanes is four and the maximum data transfer speed per lane is 1 Gbps. However, this specification has proved to be inadequate.

SUMMARY

In accordance with one or more embodiment, a display driver integrated circuit (DDIC) includes a first slave module to be initially set as a primary module to receive a mode conversion command and to be disabled based on the mode conversion command; and a second slave module to be initially set as a secondary module that does not receive the mode conversion command and to be set as the primary module instead of the first slave module when the first slave module is disabled, wherein the first and second slave modules are to control processing or transfer of image data through a channel included in or coupled to a display according to a predetermined protocol.

The mode conversion command received by the primary module may include an enter_partial_mode command to indicate that a display module enters a partial driving mode, and an enter_normal_mode command to indicate that the display module enters an entire driving mode. The first slave module may be set as the primary module to receive a set_partial_rows command accompanied by the enter_partial_mode command, and the set_partial_rows command may define a start row and an end row of a partial display area. The first slave module may be set as the primary module compares the partial display area with a first sub display area corresponding to the first slave module and a second sub display area corresponding to the second slave module to determine whether to disable the first slave module and the second display module.

The first slave module set as the primary module may maintain an enabled state when at least a portion of the partial display area is included in the first sub display area. The first slave module set as the primary module may enter a disabled state when a whole of the partial display area is included in the second sub display area. The first slave module set as the primary module may disable the second slave module when a whole of the partial display area is included in the first sub display area.

The second slave module set as the primary module may enable the first slave module when the second slave module set as the primary module receives the enter_normal_mode command. When the first slave module is enabled by the second slave, the first slave module may be set again as the primary module instead of the second slave module.

When the DDIC is to operate in a command mode that uses a frame memory, the first slave module may be set as the primary module to receive a set_page_address command defining an access page extent of the frame memory to be accessed by a host processor, and the first slave module may be set as the primary module is to compare the access page extent with a first sub display area corresponding to the first slave module and a second sub display area corresponding to the second slave module to determine whether to disable the first slave module and the second display module. The second slave module may be set as the secondary module to receive a write_memory_start command or a write_memory_continue command to be accompanied by the set_page_address command to transfer image data.

Each of the first slave module and the second slave module may include a lane module block including a clock lane module and one or more data lane modules; and a monitoring block to control whether to disable the lane module block. The monitoring block may include a command detection block to determine whether to disable the lane module block based on an internal signal from the lane module block and an external signal from other slave module; an enable control block to control conversion between an enabled state and a disabled state of the lane module block based on a control of the command detection block; and an intra communication block to perform a communication with the other slave module.

The secondary module may be enabled or disabled based on a signal from the intra communication block of the primary module to the intra communication block of the secondary module. The first slave module and the second slave module may be compatible with a mobile industry processor interface (MIPI) display serial interface and an MIPI D-PHY. The primary module may perform low power data transmission and a bus turn around operation, and wherein the secondary module is not to perform low power data transmission and the bus turn around operation. The first slave module and the second slave module may be compatible with an MIPI display command set.

In accordance with another embodiment, a display module includes a display panel divided into a plurality of sub display areas; and a display driver integrated circuit (DDIC) including a plurality of slave modules, one of the slave modules to be initially set as a primary module to receive a mode conversion command, another of the slave modules to be initially set as a secondary module which does not receive the mode conversion command. The primary module may be disabled based on the mode conversion command, and when the primary module is disabled the secondary module may be set as the primary module.

Each of the slave modules may include a lane module block including a clock lane module and one or more data lane modules; and a monitoring block to control whether to disable the lane module block, and the monitoring block may include a command detection block to determine whether to disable the lane module block based on an internal signal from the lane module block and an external signal from another slave module; an enable control block to control a conversion between an enabled state and a disabled state of the lane module block based on a control of the command detection block; and an intra communication block configured to perform a communication with the another slave module.

In accordance with another embodiment, a display system includes a host processor including a plurality of master modules; and a display module to be controlled by the host processor, the display module including: a display panel divided into a plurality of sub display areas; and a display driver integrated circuit (DDIC) including a plurality of slave modules, the slave modules respectively connected to at least one of the master modules, one of the slave modules to be initially set as a primary module to receive a mode conversion command from the host processor, another of the slave modules to be initially set as secondary module that does not receive the mode conversion command.

BRIEF DESCRIPTION OF THE DRAWINGS

Features will become apparent to those of skill in the art by describing in detail exemplary embodiments with reference to the attached drawings in which:

FIG. 6 illustrates examples of MIPI commands;
FIGS. 7A and 7B illustrate an embodiment for controlling of a slave PHY based on a set_partial_rows command;
FIGS. 8A and 8B illustrate an embodiment for controlling a slave PHY based on a set_page_address command.

DETAILED DESCRIPTION

Figure 1:
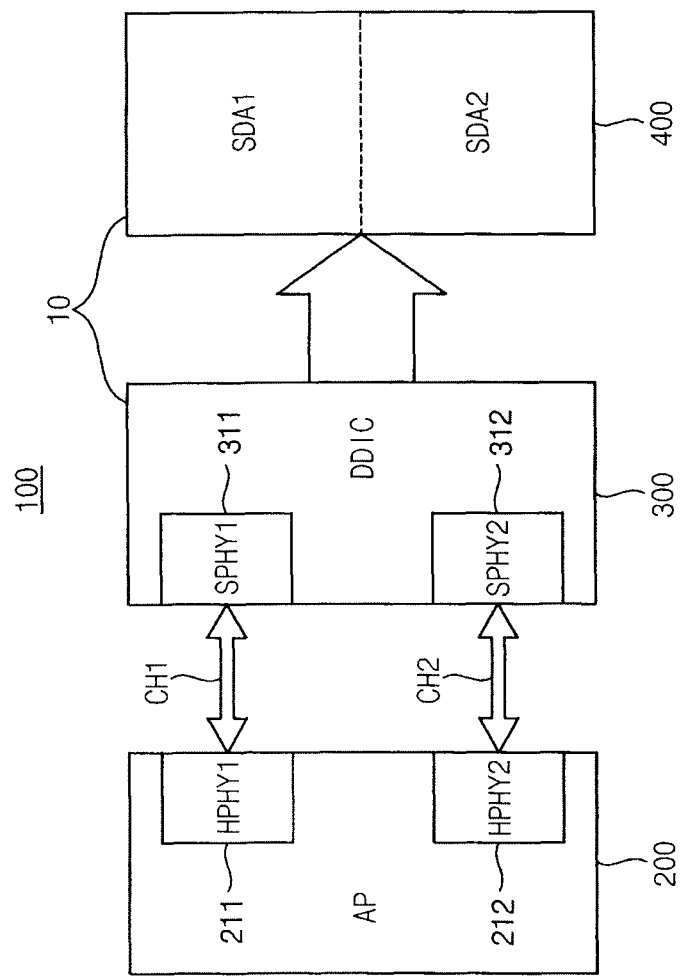
FIG. 1 illustrates an embodiment of a display system.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

FIG. 1 illustrates an embodiment of a display system 100 which includes a host processor 200 and a display module 10 controlled by the host processor 200. The host processor 200 may be a system on chip (SOC) or an application processor (AP), in which various function blocks are integrated in a chip. The display module 10 may include a display driver integrated circuit (DDIC) 300 and a display panel 400.

The host processor 200 may include a plurality of host or master physical layer blocks or modules (PHYs) and the DDIC 300 includes a plurality of slave PHYs connected to the master PHYs through a plurality of channels, respectively. As defined by the mobile industry processor interface (MIPI) alliance, PHY may be a functional or logic block that implements features for communicating over a lane interconnect. For example, PHY may include one lane module configured as a clock lane, one or more lane modules configured as data lanes, and/or a PHY adapter layer.

In one embodiment, the host processor 200 includes a first master PHY (HPHY1) 211 and a second master PHY (HPHY2) 212. The DDIC 300 includes a first slave PHY (SPHY1) 311 connected to the first master PHY 211 through a first channel CH1 and a second slave PHY (SPHY2) 312 connected to the second master PHY 212 through a second channel CH2. According to example embodiments, the number of the master and slave PHYs may be changed variously.

The display panel 400 may be divided into a first sub display area SDA1 and a second sub display area SDA2. For example, the display panel 400 may be divided by rows. A plurality of rows may be included in the first sub display area SDA1 and another plurality of rows may be included on the second sub display area SDA2. The row may indicate a plurality of pixels connected to the same gate line or the same scan line.

The first sub display area SDA1 corresponds to the first slave PHY 311 and the second sub display area SDA2 corresponds to the second slave PHY 312. In other words, the first slave PHY 311 receives image data to be displayed in the first sub display area SDA1 and the second slave PHY 312 receives image data to be displayed in the second sub display area SDA2.

The first slave PHY 311 is set initially as a primary PHY that receives a mode conversion command. The second slave PHY 312 is set initially as a secondary PHY that does not receive the mode conversion command. An example of the mode conversion command is described with reference to FIG. 6.

Initially, both of the first slave PHY 311 and the second slave PHY 312 may be enabled. The first slave PHY 311 may be disabled based on the mode conversion command. When the first slave PHY 311 is disabled. The second slave PHY 312 may be set as the primary PHY instead of the first slave PHY 311.

Figure 2:
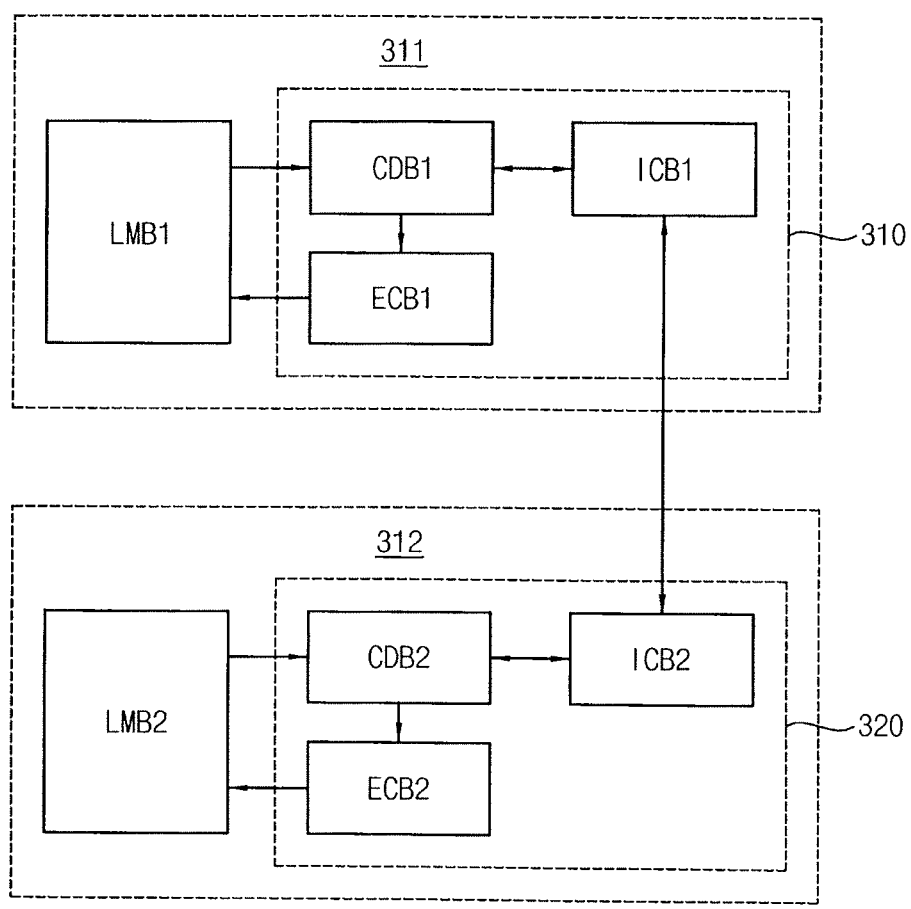
FIG. 2 illustrates an embodiment of slave PHYs.

FIG. 2 illustrates an embodiment of slave PHYs, which, for example, may be included in the display system 100 of FIG. 1. Referring to FIG. 2, a first slave PHY 311 may include a first lane module block LMB1 and a first monitoring block 310, and a second slave PHY 312 may include a second lane module block LMB2 and a second monitoring block 320. Each of the lane module blocks LMB1 and LMB2 may include one clock lane module and one or more data lane modules. The clock lane module and the data lane modules are compatible with the MIPI specifications, for example, as will be described with reference to FIG. 3.

The monitoring blocks 310 and 320 may control whether to disable the lane module blocks LMB1 and LMB2, respectively. Each of the monitoring blocks 310 and 320 may include a command detection block CDBi (i=1 or 2), an enable control block ECBi, and an intra communication block ICBi. The command detection block CDBi may determine whether to disable the lane module block LMBi based on an internal signal from the lane module block LMBi and an external signal from other slave PHY. The enable control block ECBi may control a conversion between an enabled state and a disabled state of the lane module block LMBi based on a control of the command detection block CDBi. The intra communication block ICBi may communicate with the other slave PHY.

The secondary PHY may be enabled or disabled based on a signal from the intra communication block of the primary PHY to the intra communication block of the secondary PHY. For example, when the first slave PHY 311 is the primary PHY, the second slave PHY 312 may be enabled or disabled based on a signal from the first slave PHY. When the first slave PHY 311 is disabled and the second slave PHY 312 is set as the primary PHY instead of the first slave PHY 311, the first slave PHY 311 may be enabled based on a signal from the second slave PHY 312.

In one embodiment, the DDIC 300, the display module 10, and the display system 100 including the DDIC 300 may control disabling of the slave PHYs 312 and 313 efficiently through internal control of the slave PHYs 311 and 312, without control of the host processor 200.

Figure 3:
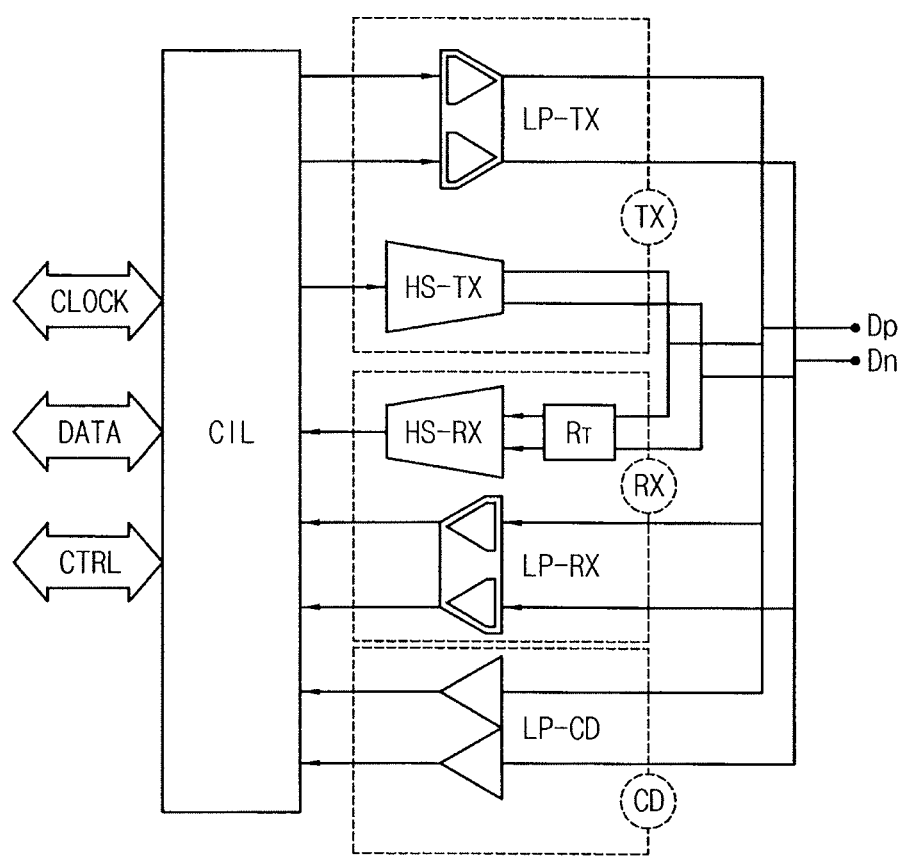
FIG. 3 illustrates an MIPI lane module.

FIG. 3 illustrates an example of an MIPI lane module 350. According to the MIPI specification, a PHY configuration includes a clock lane module and one or more data lane modules. Each of the PHY lane modules communicates, via two lines Dp and Dn, to a complementary module or block at the other side of the lane interconnect.

Referring to FIG. 3, the lane module 350 includes a control-interface logic CIL and an input-output unit. The input-output unit may include a transmission unit TX, a reception unit RX, and a contention detection unit CD. The lane module includes one or more differential high-speed (HS) functions utilizing both interconnect lines Dp and Dn simultaneously, and one or more single-ended low-power (LP) functions operating on each of the interconnect lines Dp and Dn individually. The high-speed signals have a low voltage swing, e.g. 200 mV, while the low-power signals have a large swing, e.g. 1.2V. The high-speed functions are used for high-speed data transmission. The low-power functions are mainly used for control, and/or may have other, optional use applications. The input-output functions are controlled by the control-interface logic CIL. The control-interface logic CIL interfaces with the protocol and determines the global operation of the lane module 350.

The high-speed functions may include a differential transmitter (HS-TX) and a differential receiver (HS-RX). One Lane Module may include a HS-TX, a HS-RX, or both. In one application, HS-TX and a HS-RX in a single lane module may not be enabled simultaneously.

The low-power functions may include single-ended transmitters (LP-TX), receivers (LP-RX), and low-power contention-detectors (LP-CD).

If the lane module includes a HS-TX, it may include a LP-TX. In the same way, if the lane module includes a HS-RX, it may include a LP-RX. The LP-CD function is only required for bi-directional operation. If present, the LP-CD function is enabled to detect contention situations while the LP-TX is driving low-power states.

Figure 4A:
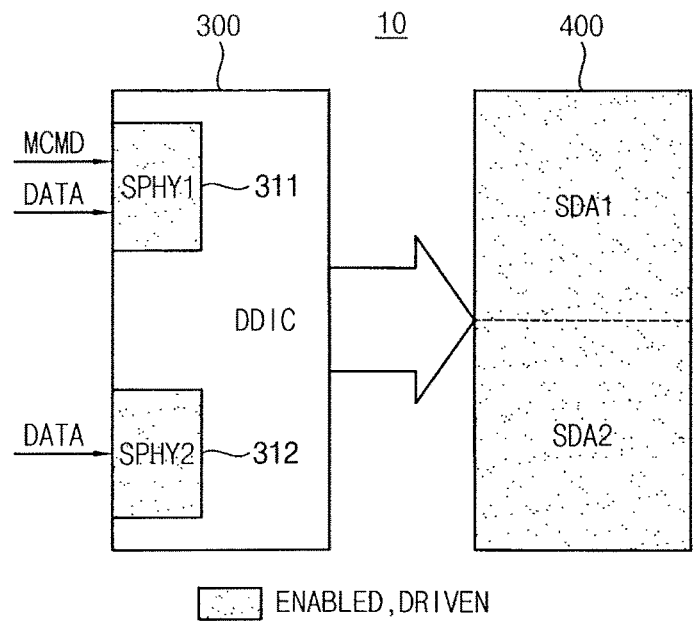
FIGS. 4A-4C illustrate an embodiment of a display driver integrated circuit.
Figure 4B:
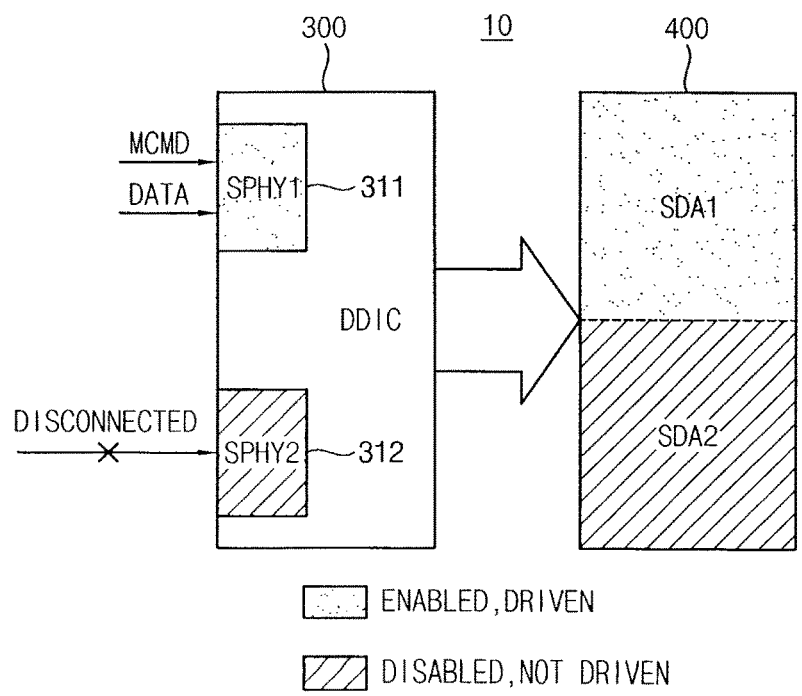
Figure 4C:
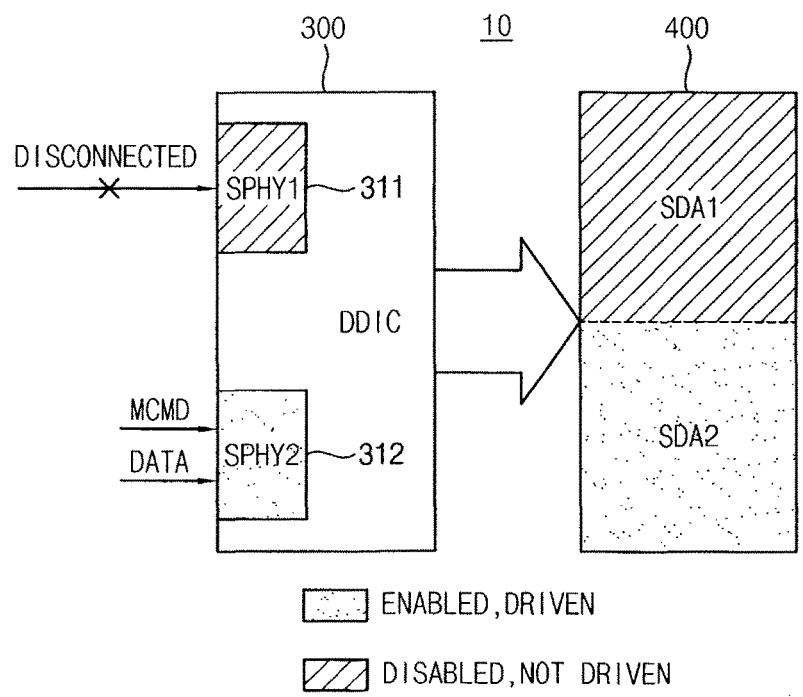

FIGS. 4A, 4B, and 4C illustrate operations performed by an embodiment of a display driver integrated circuit (DDIC), which, for example, may be DDIC 300. Referring to FIG. 4A, both of the first slave PHY 311 and the second slave PHY 312 in the DDIC 300 may be enabled, when both of the first sub display area SDA1 and the second sub display area SDA2 in the display panel 400 are driven. In this case, according to a predetermined priority, the first slave PHY 311 may be set as the primary PHY and the second slave PHY 312 may be set as the secondary PHY.

Also, as illustrated in FIG. 4A, the primary PHY 311 may receive the mode conversion command MCMD and the data, and the second PHY 312 may receive the data. As described above, the primary PHY 311 may receive the mode conversion command MCMD and the secondary PHY 312 may not receive the mode conversion command MCMD. An example of the mode conversion command MCMD is described with reference to FIG. 6.

The secondary PHY 312 may receive other commands. For example, the secondary PHY 312 may receive a write_memory_start command or a write_memory_continue command for data transfer according to the MIPI specification. Almost all commands irrelevant of data transfer may be received only by the primary PHY 311. The low power data transmission and the bus turn around according to the MIPI specification may be performed only by the primary PHY 311 and may not be performed by the secondary PHY 312.

Referring to FIG. 4B, the first slave PHY 311 may be enabled and the second slave PHY 312 may be disabled, when only the first sub display area SDA1 is driven and the second sub display area SDA2 is not driven. The first slave PHY 311 may maintain a state set as the primary PHY and the channel to the second slave PHY 312 may be disconnected.

Referring to FIG. 4C, the first slave PHY 311 may be disabled and the second slave PHY 312 may be enabled, when the first sub display area SDA1 is not driven and only the second sub display area SDA2 is driven. In this case, the second slave PHY 312 may be set as the slave PHY instead of the first slave PHY that is disabled, and the channel to the first slave PHY 311 may be disconnected.

Thus, in one embodiment, the DDIC 300 and the display module 10 including the DDIC 300 may reduce power consumption by disabling a portion of the slave PHYs 311 and 312 in the partial driving mode.

Figure 5A:
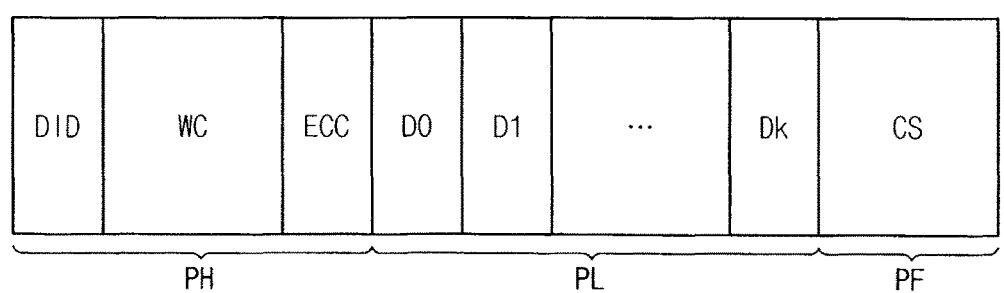
FIGS. 5A-5C illustrate MIPI packet structures.
Figure 5B:
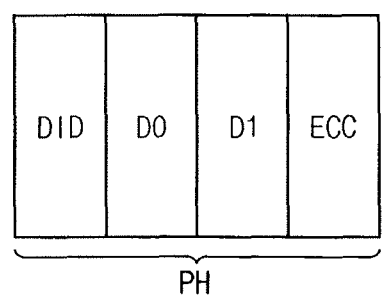
Figure 5C:
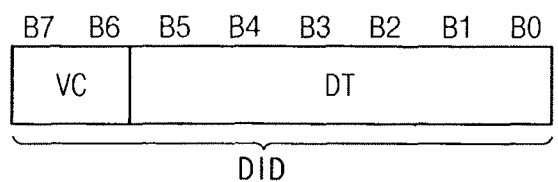

FIGS. 5A, 5B, and 5C illustrate MIPI packet structures. FIG. 5A illustrates a long packet format, FIG. 5B illustrates a short packet format, and a FIG. 5C illustrates a data identifier.

Referring to FIG. 5A, the long packet includes a packet header PH of 32 bits, a data payload PL of variable bits, and a packet footer PF of 16 bits. The packet header PH includes a data identifier DID of 8 bits, a word count WC of 16 bits, and an error-correcting code ECC of 8 bits. Each of the data D0 through Dk is 8 bit data. The number k of the data D0 through Dk corresponds to the word count WC. The packet footer PF may include a checksum CS of 16 bits.

Referring to FIG. 5B, the short packet includes a packet header PH. The packet header PH may include a data identifier DID, data D0 and D1 of 2 bytes and an error-correcting code ECC of 8 bits. Commands may be included in the location of the data D0 and D1 depending on the data type of the short packet. The short packet does not include a packet footer and it has a length of 4 bytes.

Referring to FIG. 5C, the data identifier DID may include two bits B6 and B7 for identifying a virtual channel VC and six bits B0 through B5 for identifying a data type DT.

The command detection block CDBi in FIG. 2 may refer to the data type DT of the data identifier DID in the long packet and the short packet to identify whether the received packet include a command and a type of the command. The command detection block CDBi may refer to the data type DT to detect and analyze the commands that are required for the operations of the monitoring blocks 310 and 320 and the command detection block CDBi may neglect other commands and data.

FIG. 6 illustrates examples of MIPI commands which may be related with example embodiments herein, hex codes, descriptions, and numbers of the parameters of the commands. The commands include enter_normal_mode command, an enter_partial_mode command, a set_page_address command, and a set_partial_rows command.

The enter_normal_mode command indicates that a display module enters an entire driving mode and the enter_partial_mode command indicates that the display module enters a partial driving mode. The whole display area is used for image display in the entire driving mode and a portion of the display area is used for image display in the partial driving mode. The above-mentioned mode conversion command may include the enter_normal_mode command and the enter_partial_mode command.

According to MIPI specifications, the enter_partial_mode command may accompany the set_partial_rows command. An example of state control based on the enter_partial_mode command and the set_partial_rows command is described with reference to FIGS. 7A and 7B.

The second slave PHY 312 set as the primary PHY as illustrated in FIG. 4C may enable the first slave PHY 311 when the second slave PHY 312 receives the enter_normal_mode command. When the first slave PHY 311 is enabled by the second slave PHY 312, the first slave PHY 311 may be set again as the primary PHY, instead of the second slave PHY 312, as illustrated in FIGS. 4A and 4B.

The set_page_address command and the set_partial_rows command are described with reference to FIGS. 7A, 7B, 8A, and 8B.

Figure 7B:
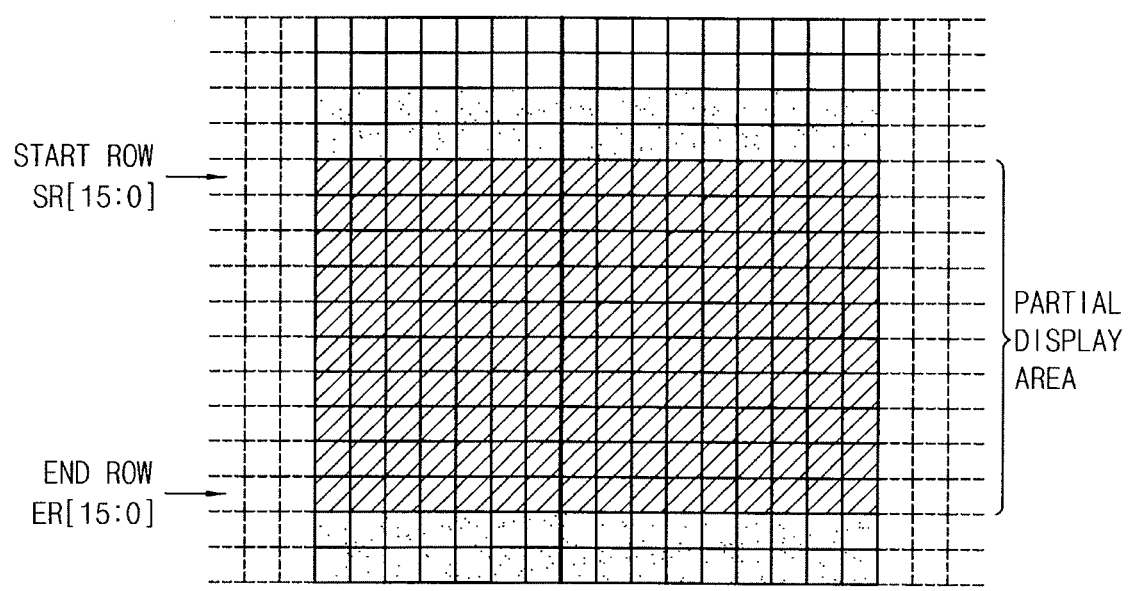

FIGS. 7A and 7B illustrate an embodiment for controlling a slave PHY based on a set_partial_rows command according to the MIPI specification. Referring FIGS. 7A and 7B, the set_partial_rows command is accompanied by the enter_partial_mode command and may define a start row SR and an end row ER of a partial display area. The set_partial_rows command may include first through fourth parameters. The first and second parameters include 16 bits SR0 through SR15 indicating the start row SR, and the third and fourth parameters include 16 bits ER0 through ER15 indicating the end row ER.

As described with reference to FIGS. 4A, 4B, and 4C, the first slave PHY 311 set as the primary PHY may compare the partial display area, which indicated by the start row SR and the end row ER, with the first sub display area SDA1 corresponding to the first slave PHY and the second sub display area SDA2 corresponding to the second slave PHY to determine whether to disable the first slave PHY and the second display PHY.

The first slave PHY 311 set as the primary PHY may maintain the enabled state when at least a portion of the partial display area is included in the first sub display area SDA1, as illustrated in FIGS. 4A and 4B.

The first slave PHY 311 set as the primary PHY may enter the disabled state when the whole of the partial display area is included in the second sub display area SDA2, as illustrated in FIG. 4C.

The first slave PHY 311 set as the primary PHY disables the second slave PHY 312 when the whole of the partial display area is included in the first sub display area SDA1, as illustrated in FIG. 4B.

Figure 8B:
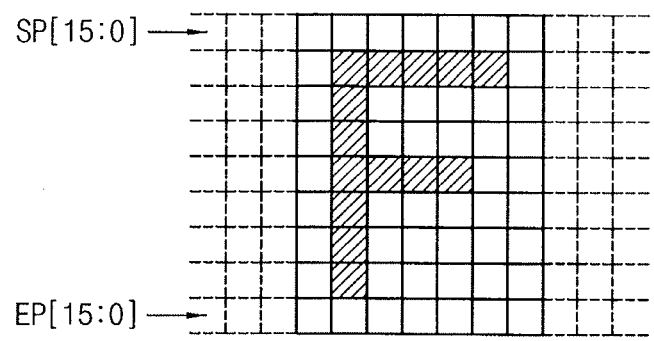

FIGS. 8A and 8B illustrate an embodiment for controlling a slave PHY based on a set_page_address command according to the MIPI specification. Referring to FIGS. 8A and 8B, the set_page_address command may define a start page SP and an end page ER of an access page extent. The set_page_address command may include first through fourth parameters. The first and second parameters include 16 bits SP0 through SP15 indicating the start page SP, and the third and fourth parameters include 16 bits EP0 through EP15 indicating the end page EP.

The DDIC 10 in FIG. 1 may operate in a command mode that uses a frame memory according to the MIPI specifications. In this case, the first slave PHY 311 set as the primary PHY may receive the set_page_address command defining the access page extent of the frame memory that is accessed by the host processor 200. The access page extent may be defined by the start page SP and the end page EP as illustrated in FIGS. 8A and 8B.

The first slave PHY 311 set as the primary PHY may compare the access page extent with the first sub display area SDA1 corresponding to the first slave PHY 311 and the second sub display area SDA2 corresponding to the second slave PHY 312 to determine whether to disable the first slave PHY 311 and the second display PHY 312.

The second slave PHY 312 set as the secondary PHY may receive a write_memory_start command or a write_memory_continue command that is accompanied by the set_page_address command to transfer image data, according to the MIPI specifications.

Figure 9A:
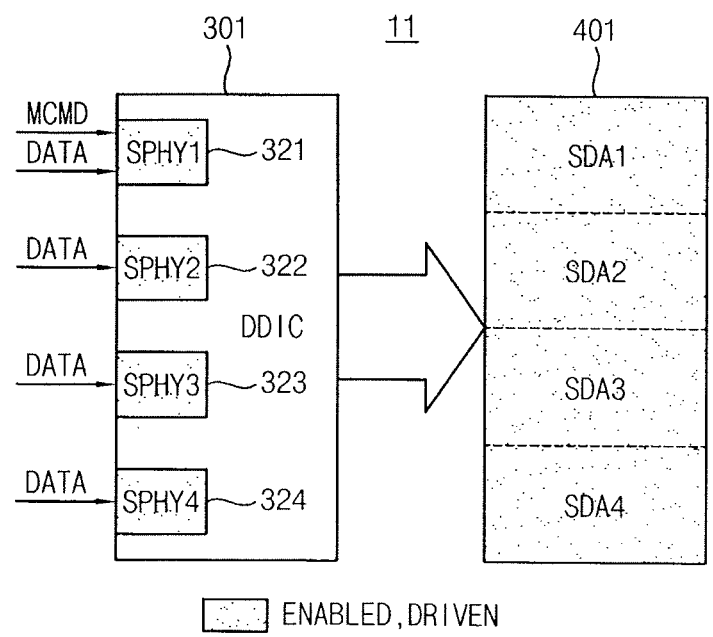
FIGS. 9A and 9B illustrate operations of a DDIC according to one embodiments.
Figure 9B:
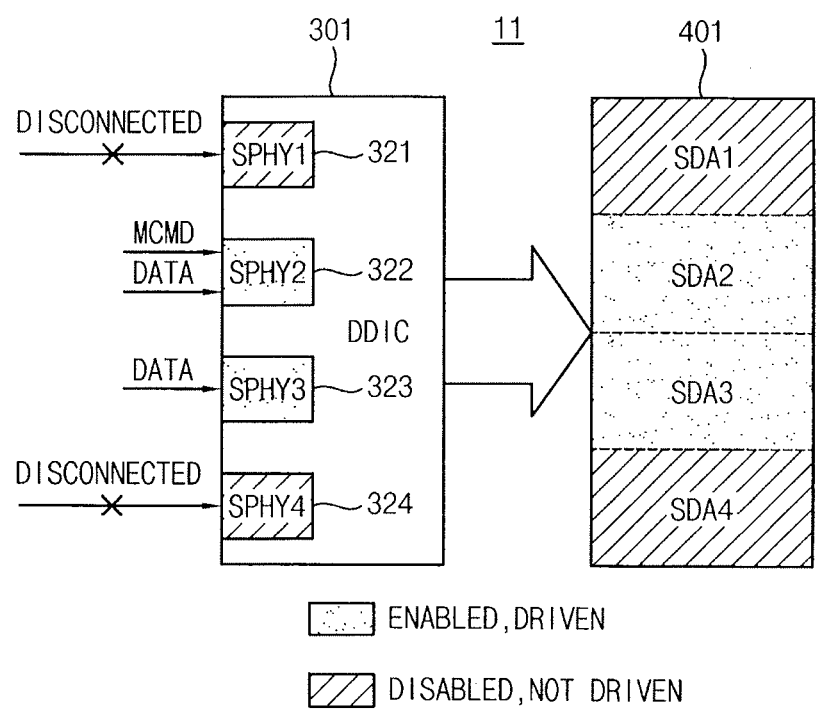

FIGS. 9A and 9B illustrate operations of another embodiment of a DDIC 301. FIGS. 4A, 4B, and 4C illustrate an embodiment of the display module 10 where the display panel 400 is divided into the two sub display areas SDA1 and SDA2 and the DDIC includes the two slave PHYs 311 and 312. In contrast, FIGS. 9A and 9B illustrate a display module 11 where a display panel 401 is divided into four sub display areas SDA1, SDA2, SDA3, and SDA4, and a DDIC 301 includes four slave PHYs 321, 322, 323, and 324. For example, the display panel 400 of FIGS. 4A, 4B, and 4C may have a wide quad high definition (WQHD) resolution and the display panel 401 of FIGS. 9A and 9B may have an ultra high definition (UHD) resolution. The number of the sub display areas and the corresponding slave PHYs may be increased as the resolution of the display panel increases.

Referring to FIG. 9A, all of the first through fourth slave PHYs 321 through 324 in the DDIC 301 may be enabled, when all of the first through fourth sub display areas SDA1 through SDA4 in the display panel 401 are driven. In this case, according to a predetermined priority, the first slave PHY 321 may be set as the primary PHY and the second, third and fourth slave PHYs 322, 323 and 324 may be set as the secondary PHYs.

As illustrated in FIG. 9A, the primary PHY 321 may receive the mode conversion command MCMD and the data, and the secondary PHYs 322, 323 and 324 may receive the data. As described above, the primary PHY 321 may receive the mode conversion command MCMD and the secondary PHYs 322, 323 and 324 may not receive the mode conversion command MCMD. The mode conversion command MCMD may include the enter_partial_mode command and the enter_normal_mode command as described, for example, with reference to FIG. 6.

The secondary PHYs 322, 323 and 324 may receive other commands. For example, the secondary PHYs 322, 323 and 324 may receive the write_memory_start command or the write_memory_continue command for data transfer according to MIPI specification. Almost all commands irrelevant of data transfer may be received only by the primary PHY 321. The low power data transmission and the bus turn around according to the MIPI specification may be performed only by the primary PHY 321 and may not be performed by the secondary PHYs 322, 323 and 324.

Referring to FIG. 9B, the second and third slave PHYs 322 and 323 may be enabled and the first and fourth slave PHYs 321 and 324 may be disabled, when the second and third sub display areas SDA2 and SDA3 are driven and the first and fourth sub display areas SDA1 and SDA4 are not driven. In this case, the second slave PHY 322 may be set as the primary PHY instead of the first slave PHY 321 that is disabled, and the channels to the first and fourth slave PHYs 321 and 324 may be disconnected.

In one embodiment, the DDIC 301 and the display module 11 including the DDIC 301 may reduce power consumption by disabling a portion of the slave PHYs 321, 322, 323, and 324 in the partial driving mode.

Figure 10:
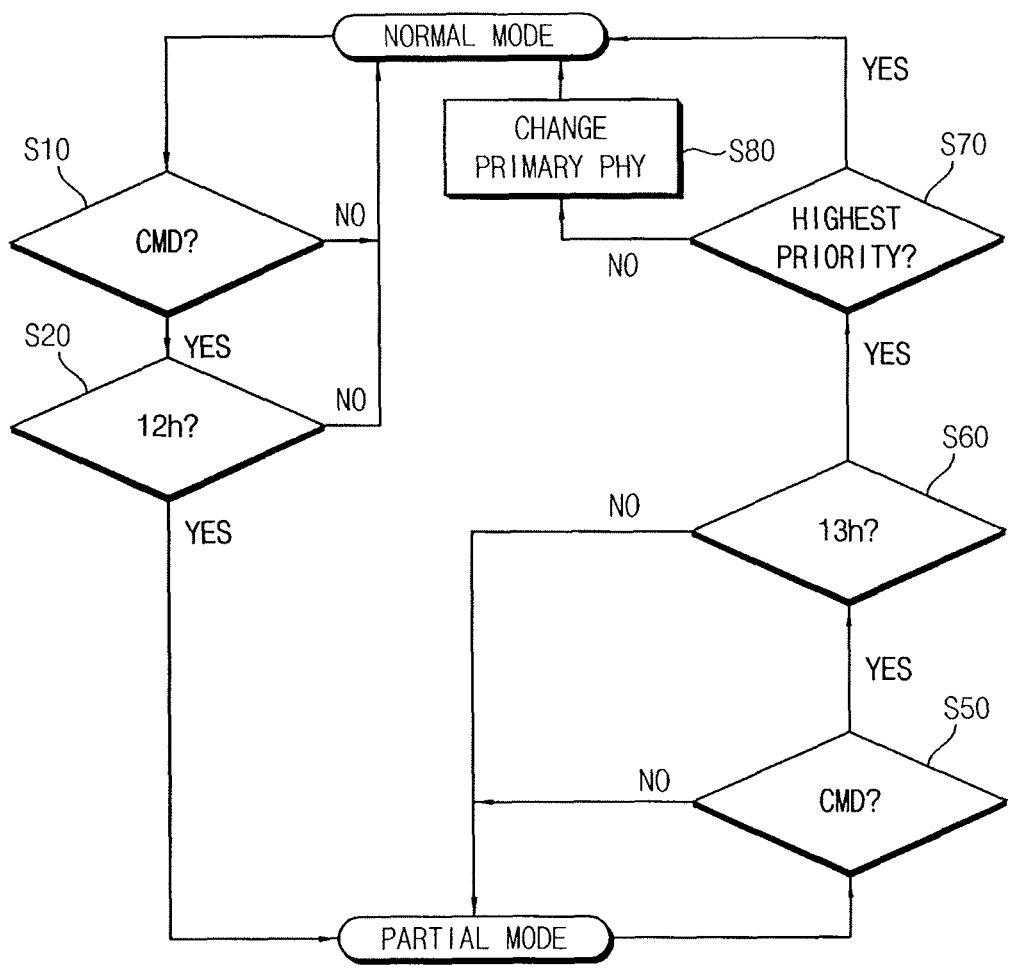
FIG. 10 illustrates an embodiment of a method for operating a DDIC.

FIG. 10 illustrates an embodiment of a method for operating a DDIC. As an example, as illustrated in FIGS. 4A, 4B, and 4C, it may be assumed that the DDIC includes the first slave PHY 311 and the second slave PHY 312. In the normal mode or the entire driving mode as illustrated in FIG. 4A, all of the first and second slave PHYs 311 and 312 are enabled. The first slave PHY 311, according to the predetermined priority, may be set as the primary PHY to receive the mode conversion command.

In normal mode, the first slave PHY 311 set as the primary PHY monitors whether a command is received (S10). When the received command is the enter_partial_mode command (12h) (S20: YES), the display module 10 enters the partial mode or the partial driving mode. The first slave PHY 311 may maintained the status of the primary PHY when the first slave PHY 311 maintains the enabled state as illustrated in FIG. 4B. The second slave PHY 312 may be set as the primary PHY when the first slave PHY 311 is disabled as illustrated in FIG. 4C. As such, the first slave PHY 311 or the second slave PHY may be set as the primary PHY according to the enabled or disabled states and the predetermined priority in the partial mode.

The primary PHY monitors whether a command is received (S50). When the received command is the enter_normal_mode command (13h) (S60: YES), the display module 10 enters the normal mode. In this case, the primary PHY determines whether the primary PHY itself has the highest priority (S70). When the primary PHT has the highest priority (S70: YES), the display module 10 enters the normal mode with keeping the status of the primary PHY. When the primary PHT does not have the highest priority (S70: NO), another slave PHY having the highest priority is set as the primary PHY (S80) before the display module 10 enters the normal mode.

In one embodiment, the DDIC, the display module and the display system including the DDIC includes a plurality of slave PHYs compatible with the MIPI specifications, and thus supports a high-resolution display that cannot be supported by the specified four lanes. In addition, the DDIC, the display module, and the display system including the DDIC may reduce power consumption by disabling a portion of the slave PHYs in the partial driving mode. Furthermore, the DDIC, the display module, and the display system including the DDIC may control disabling of the slave PHYs efficiently through internal control of the slave PHYs without control of a host device or a host processor.

Figure 11:
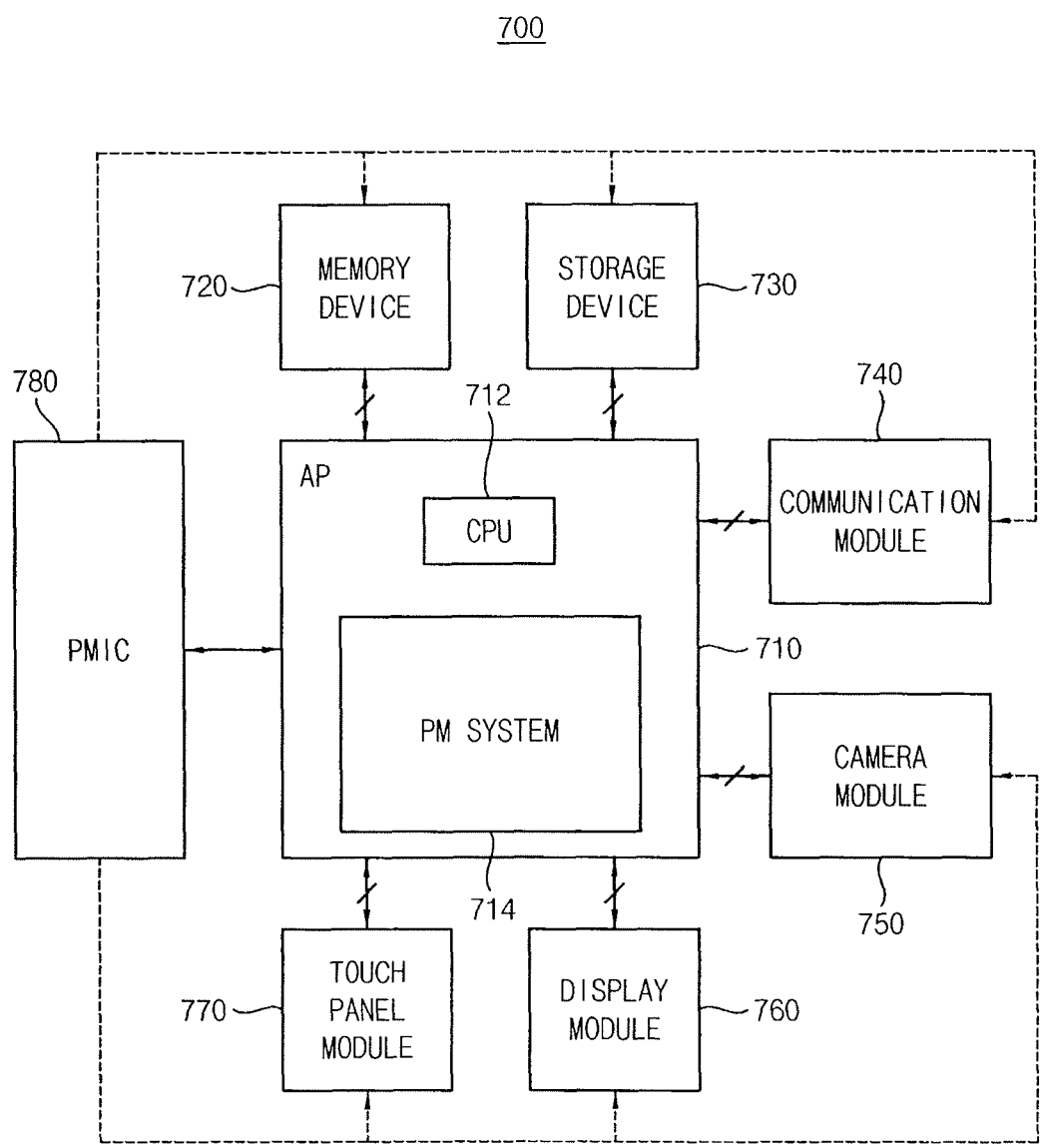
FIG. 11 illustrates an embodiment of a mobile device.

FIG. 11 illustrates an embodiment of a mobile device 700 which includes a system on chip 710 and a plurality of functional modules 740, 750, 760, and 770. The mobile device 700 may further include a memory device 720, a storage device 730 and a power management integrated circuit (PMIC) 780.

The system on chip 710 controls overall operations of the mobile device 700. The system on chip 710 may control the memory device 720, the storage device 730, and the functional modules 740, 750, 760, and 770. For example, the system on chip 710 may be an application processor (AP). The system on chip 710 may include a CPU core 711 and a power management (PM) system 714.

The memory device 720 and the storage device 730 may store data for operations of the mobile device 700. The memory device 720 may correspond to a volatile semiconductor memory device such as a dynamic random access memory (DRAM) device, a static random access memory (SRAM) device, a mobile DRAM, etc. In addition, the storage device 730 may correspond to a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In some embodiments, the storage device 730 may correspond to a solid state drive (SSD) device, a hard disk drive (HDD) device, a CD-ROM device, etc.

The functional modules 740, 750, 760, and 770 perform various functions of the mobile device 700. For example, the mobile device 700 may comprise a communication module 740 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for a microwave access (WIMAX) module, etc.), a camera module 750 that performs a camera function, a display module 760 that performs a display function, a touch panel module 770 that performs a touch sensing function, etc. In some embodiments, the mobile device 700 further includes a global positioning system (GPS) module, a microphone (MIC) module, a speaker module, a gyroscope module, etc. However, a kind of the functional modules 740, 750, 760, and 770 in the mobile device 700 is not limited thereto.

The PMIC 780 may provide driving voltages to the system on chip 710, the memory device 720 and the functional modules 740, 750, 760 and 770, respectively.

According to example embodiments, the display module 760 includes a display panel divided into a plurality of sub display areas and a display driver integrated circuit (DDIC) including a plurality of slave PHYs. One of the slave PHYs is set initially as a primary PHY that receive a mode conversion command, and the remainder of the slave PHYs are set initially as secondary PHYs that do not receive the mode conversion command. The primary PHY is disabled based on the mode conversion command, and when the primary PHY is disabled, one of the secondary PHYs is set as the primary PHY instead of the disabled primary PHY.

Figure 12:
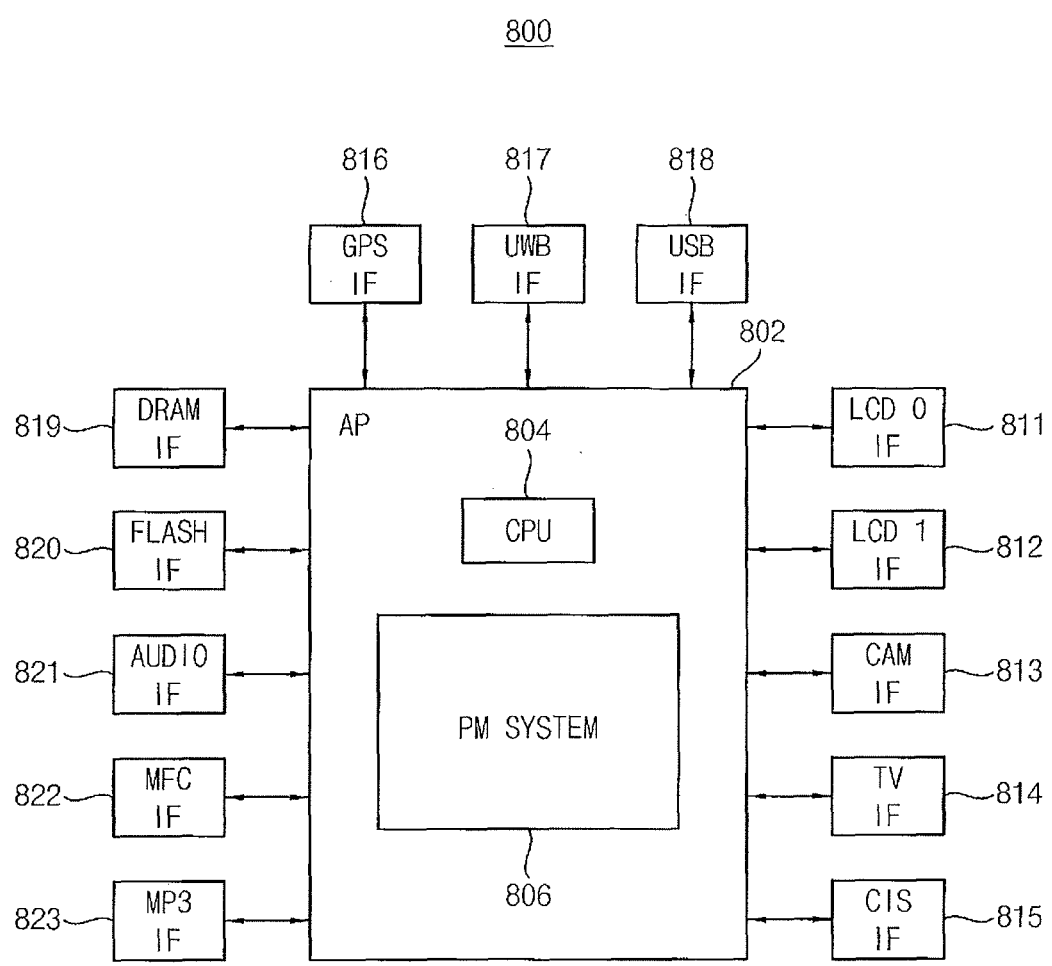
FIG. 12 illustrates another embodiment of a mobile device.

FIG. 12 illustrates another embodiment of a mobile device 800, which adopts an example interface according to example embodiments. Referring to FIG. 12, the mobile device 800 may include a system on chip 802 and a plurality of interfaces 811 to 823. According to example embodiments, the mobile device 800 may be a mobile phone, a smart phone, a personal digital assistant (PDA), a portable multimedia player (PMP), a digital camera, a music player, a portable game console, a navigation system, etc.

The system on chip 802 controls overall operations of the mobile device 800. The system on chip 802 may be an application processor (AP). The system on chip 802 may include a CPU core 804 and a power management (PM) system 806.

The system on chip 802 may communicate with each of a plurality of peripheral devices through each of a plurality of interfaces 811 to 823. For example, each of the plurality of interfaces 811 to 823 may transmit at least one control signal, which is output from a corresponding intellectual property (IP) among a plurality of IPs embodied in each of power domains, to each of the plurality of peripheral devices.

For example, the system on chip 802 may control a power state and an operation state of each display device through each display interface 811 and 812. The display device includes a liquid crystal display (LCD), a light emitting diode (LED) display, an organic light emitting diode (OLED) display or an active matrix organic light-emitting diode (AMOLED) display.

The system on chip 802 may control a power state and an operation state of a camcorder through a camcorder interface 813, control a power state and an operation state of a TV module through a TV interface 814, and control a power state and an operation state of a camera module or an image sensor module through an image sensor interface 815.

The system on chip 802 may control a power state and an operation state of a GPS module through a GPS interface 816, control a power state and an operation state of an ultra wideband (UWB) module through a UWB interface 817, and control a power state and an operation state of a USB drive through a USB drive interface 818.

The system on chip 802 may control a power state and an operation state of a dynamic random access memory (DRAM) through a DRAM interface 819, control a power state and an operation state of a non-volatile memory device, e.g., a flash memory, through a non-volatile memory interface 820, e.g., a flash memory interface, control a power state and an operation state of an audio module through an audio interface 821, control a power state of a multi-format codec (MFC) through an MFC interface 822, and control a power state of an MP3 player through an MP3 player interface 823. Here, a module or an interface may be embodied in hardware or software.

Figure 13:
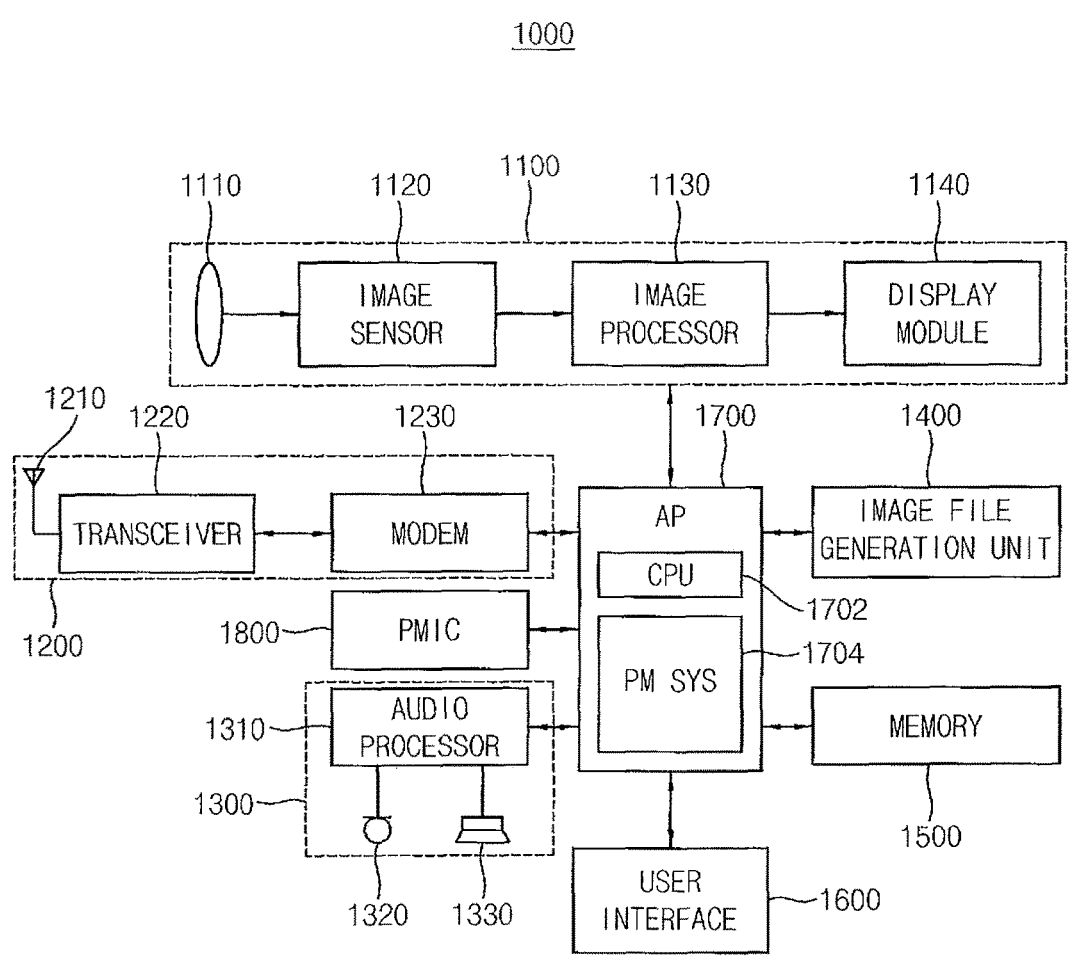
FIG. 13 illustrates an embodiment of a portable terminal.

FIG. 13 illustrates an embodiment of a portable terminal 1000 which includes an image processing block 1100, a wireless transceiving block 1200, an audio processing block 1300, an image file generation unit 1400, a memory device 1500, a user interface 1600, an application processor 1700, and a power management integrated circuit (PMIC) 1800.

The image processing block 1100 includes a lens 1110, an image sensor 1120, an image processor 1130, and a display module 1140. The wireless transceiving block 1200 includes an antenna 1210, a transceiver 1220, and a modem 1230. The audio processing block 1300 includes an audio processor 1310, a microphone 1320, and a speaker 1330.

According to example embodiments, the display module 1140 includes a display panel divided into a plurality of sub display areas and a display driver integrated circuit (DDIC) including a plurality of slave PHYs. One of the slave PHYs is set initially as a primary PHY that receive a mode conversion command, and the remainder of the slave PHYs are set initially as secondary PHYs that do not receive the mode conversion command. The primary PHY is disabled based on the mode conversion command, and when the primary PHY is disabled, one of the secondary PHYs is set as the primary PHY instead of the disabled primary PHY.

The portable terminal 1000 may include various kinds of semiconductor devices. The application processor 1700 requires low power consumption and a high performance. The application processor 1700 has multi-cores as a manufacturing process has become minutely detailed. The application processor 1700 may include a CPU core 1702 and a power management (PM) system 1704.

The PMIC 1800 may provide driving voltages to the image processing block 1100, the wireless transceiving block 1200, the audio processing block 1300, the image file generation unit 1400, the memory device 1500, the user interface 1600, and the application processor 1700, respectively.

The above described embodiments may be applied to various kinds of devices and systems such as a mobile phone, a smart phone, a tablet computer, a laptop computer, a personal digital assistant PDA, a portable multimedia player PMP, a digital television, a digital camera, a portable game console, a music player, a camcorder, a video player, a navigation system, etc.

The modules and blocks discussed herein may be implemented in hardware, software (e.g., firmware, middleware, etc.), or both, which are capable of implementing operations that conform with MIPI specifications. For example, these modules or blocks may be based on or conform with one or more of the following MIPI specifications, but are not limited to MIPI specification versions: Specification for Display Command Set (DCS) Version 1.2 r07 16 Jun. 2014, Specification for D-PHY Version 1.2 r07 01 Aug. 2014 and Specification for Display Serial Interface (DSI) Version 1.2 r07 16 Jun. 2014, as well as future MIPI specification versions that either share features of these versions and/or which are otherwise implementable by the embodiments of the invention described herein.

Moreover, the methods, processes, and/or operations described herein may be performed by code or instructions to be executed by a computer, processor, controller, module, logic block, or other signal processing device. The computer, processor, controller, module, logic block, or other signal processing device may be those described herein or one in addition to the elements described herein. Because the algorithms that form the basis of the methods (or operations of the computer, processor, controller, module, logic block, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

By way of summation and review, an MIPI (Mobile Industry Processor Interface) is widely used in mobile products of a resolution equal to or higher than nHD (360×640 pixels). According to the MIPI specification of D-PHY, the maximum number of data lanes is four, which may support a transfer speed of 1 Gbps. The resolution of the display is ever-increasing to meet consumer demand and applications, but the MIPI alliance does not suggest any solution to the increasing resolution.

In accordance with one or more of the aforementioned embodiments, a plurality of slave modules (PHYs) receive image data to be displayed in sub display areas SDA1 and SDA2, respectively. According to a predetermined priority, one slave PHY is set as the primary PHY receiving a mode conversion command MCMD, and the other slave PHYs are disabled or set as the secondary PHYs. As a result, improved performance may be realized, at least for some embodiments.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display driver integrated circuit (DDIC), comprising:
a first slave module to be initially set as a primary module to receive a mode conversion command and to be disabled based on the mode conversion command; and
a second slave module to be initially set as a secondary module that does not receive the mode conversion command and to be set as the primary module instead of the first slave module when the first slave module is disabled, wherein the first and second slave modules are to control processing or transfer of image data through a channel included in or coupled to a display according to a predetermined protocol corresponding to a mobile industry processor interface (MIPI) display serial interface, wherein the mode conversion command received by the primary module includes an enter_partial_mode command to indicate that a display module enters a partial driving mode, and wherein the primary module and the secondary module are to be enabled when the primary module receives a mode conversion command including an enter_normal_mode command indicating that the display module enters an entire driving mode.

2. The DDIC as claimed in claim 1, wherein:
the first slave module set as the primary module is to receive a set_partial_rows command accompanied by the enter_partial_mode command, the set_partial_rows command defining a start row and an end row of a partial display area, and
the first slave module set as the primary module compares the partial display area with a first sub display area corresponding to the first slave module and a second sub display area corresponding to the second slave module to determine whether to disable the first slave module and the second slave module.

3. The DDIC as claimed in claim 2, wherein the first slave module set as the primary module is to maintain an enabled state when at least a portion of the partial display area is included in the first sub display area.

4. The DDIC as claimed in claim 2, wherein the first slave module set as the primary module is to enter a disabled state when a whole of the partial display area is included in the second sub display area.

5. The DDIC as claimed in claim 2, wherein the first slave module set as the primary module disables the second slave module when a whole of the partial display area is included in the first sub display area.

6. The DDIC as claimed in claim 1, wherein the second slave module set as the primary module is to enable the first slave module when the second slave module set as the primary module receives the enter_normal_mode command.

7. The DDIC as claimed in claim 6, wherein, when the first slave module is to be enabled by the second slave module, the first slave module is set again as the primary module instead of the second slave module.

8. The DDIC as claimed in claim 1, wherein:
when the DDIC is to operate in a command mode that uses a frame memory, the first slave module is to be set as the primary module to receive a set_page_address command defining an access page extent of the frame memory to be accessed by a host processor, and
the first slave module is to set as the primary module is to compare the access page extent with a first sub display area corresponding to the first slave module and a second sub display area corresponding to the second slave module to determine whether to disable the first slave module and the second slave module.

9. The DDIC as claimed in claim 8, wherein the second slave module is to set as the secondary module to receive a write_memory_start command or a write_memory_continue command to be accompanied by the set_page_address command to transfer image data.

10. The DDIC as claimed in claim 1, wherein each of the first slave module and the second slave module includes:
a lane module block including a clock lane module and one or more data lane modules; and
a monitoring block to control whether to disable the lane module block.

11. The DDIC as claimed in claim 10, wherein the monitoring block includes:
a command detection block to determine whether to disable the lane module block based on an internal signal from the lane module block and an external signal from other slave module;
an enable control block to control conversion between an enabled state and a disabled state of the lane module block based on a control of the command detection block; and
an intra communication block to perform a communication with the other slave module.

12. The DDIC as claimed in claim 11, wherein the secondary module is enabled or disabled based on a signal from the intra communication block of the primary module to the intra communication block of the secondary module.

13. The DDIC as claimed in claim 1, wherein the first slave module and the second slave module are compatible with the mobile industry processor interface (MIPI) display serial interface and an MIPI D-PHY.

14. The DDIC as claimed in claim 13, wherein the primary module is to perform low power data transmission and a bus turn around operation, and wherein the secondary module is not to perform low power data transmission and the bus turn around operation.

15. A display module, comprising:
a display panel divided into a plurality of sub display areas; and
a display driver integrated circuit (DDIC) including a plurality of slave modules, one of the slave modules to be initially set as a primary module to receive a mode conversion command and another of the slave modules to be initially set as a secondary module which does not receive the mode conversion command, the slave modules corresponding to mobile industry processor interface (MIPI) protocol, wherein the mode conversion command received by the primary module includes:

an enter_partial_mode command to indicate that the display module enters a partial driving mode, or an enter_normal_mode command to indicate that the display module enters an entire driving mode.

16. The display module as claimed in claim 15, wherein:
the primary module is disabled based on the mode conversion command, and
when the primary module is disabled, the secondary module is set as the primary module.

17. The display module as claimed in claim 15, wherein each of the slave modules includes:
- a lane module block including a clock lane module and one or more data lane modules; and
- a monitoring block to control whether to disable the lane module block, the monitoring block including:
  - a command detection block to determine whether to disable the lane module block based on an internal signal from the lane module block and an external signal from another slave module;
  - an enable control block to control a conversion between an enabled state and a disabled state of the lane module block based on a control of the command detection block; and
  - an intra communication block configured to perform a communication with the another slave module.

18. A display system, comprising:
a host processor including a plurality of master modules; and
a display module to be controlled by the host processor, the display module including:
- a display panel divided into a plurality of sub display areas; and
- a display driver integrated circuit (DDIC) including a plurality of slave modules corresponding to mobile industry processor interface (MIPI) protocol, the slave modules respectively connected to at least one of the master modules, one of the slave modules to be initially set as a primary module to receive a mode conversion command from the host processor, another of the slave modules to be initially set as secondary module that does not receive the mode conversion command, wherein the mode conversion command received by the primary module includes:

an enter_partial_mode command to indicate that the display module enters a partial driving mode, or an enter_normal_mode command to indicate that the display module enters an entire driving mode.

* * * * *